United States Patent
Dostál et al.

(10) Patent No.: US 8,374,158 B2
(45) Date of Patent: Feb. 12, 2013

(54) METHOD FOR INTERFACING A SECOND COMMUNICATION NETWORK COMPRISING AN ACCESS NODE WITH A FIRST COMMUNICATION NETWORK COMPRISING A CONTACT NODE

(75) Inventors: Pavel Dostál, Morice (CZ); Petr Gotthard, Brno (CZ); Cornelia Kappler, Berlin (DE); Rainer Liebhart, München (DE); Erwin Postmann, Forchtenstein (AT); Morten Schläger, Berlin (DE); Di Zhou, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 898 days.

(21) Appl. No.: 12/065,528

(22) PCT Filed: Aug. 30, 2006

(86) PCT No.: PCT/EP2006/065807
§ 371 (c)(1),
(2), (4) Date: Jun. 16, 2008

(87) PCT Pub. No.: WO2007/025981
PCT Pub. Date: Mar. 8, 2007

(65) Prior Publication Data
US 2009/0219899 A1    Sep. 3, 2009

(30) Foreign Application Priority Data

Sep. 2, 2005    (EP) .................................... 05090254

(51) Int. Cl.
*H04W 4/00*    (2009.01)
(52) U.S. Cl. ........................................ 370/338; 370/328
(58) Field of Classification Search ................... 370/310, 370/328, 338, 401; 709/217–218, 223
See application file for complete search history.

(56) References Cited

U.S. PATENT DOCUMENTS 6,636,502 B1 * 10/2003  Lager et al. .................... 370/352
6,687,243 B1 *  2/2004  Sayers et al. .................. 370/356

(Continued)

FOREIGN PATENT DOCUMENTS

| CN | 1481081 A | 3/2004 |
| CN | 1568075 A | 1/2005 |
| WO | 02063900 A1 | 8/2002 |

OTHER PUBLICATIONS

3GPP; Universal Mobile Telecommunications System (UMTS); 3GPP system to Wireles Local Area Network (WLAN) interworking; System description (3GPP TS 23.234 version 6.5.0 Release 6), ETSI Technical Specification; (Jun. 2005), pp. 1-80 XP014030505.

*Primary Examiner* — Warner Wong
(74) *Attorney, Agent, or Firm* — Laurence A. Greenberg; Werner H. Stemer; Ralph E. Locher (57) ABSTRACT

An operational method interfaces a second communication network containing an access node with a first communication network encompassing a contact node. In a first step, an access node reads or receives an identity which is specific for the second communication network and is stored in a storage medium of a memory node. Then an interfacing message containing the identity that is specific for the second communication network is transmitted from the access node to the contact node, which is defined by an address stored in the storage medium. A packet data service to the access node is supplied by the contact node such that the second communication network is interfaced with the first communication network. An assembly and a storage medium are provided for interfacing the second communication network with the first communication network.

31 Claims, 4 Drawing Sheets

U.S. PATENT DOCUMENTS

| | | | |
|---|---|---|---|
| 7,039,025 B1 * | 5/2006 | Menon et al. | 370/328 |
| 7,551,576 B2 | 6/2009 | Ahmavaara | |
| 7,983,229 B2 * | 7/2011 | Bachmann et al. | 370/338 |
| 2003/0090998 A1 * | 5/2003 | Lee et al. | 370/229 |
| 2003/0202521 A1 * | 10/2003 | Havinis et al. | 370/401 |
| 2004/0037260 A1 | 2/2004 | Kakemizu et al. | |
| 2004/0068571 A1 * | 4/2004 | Ahmavaara | 709/228 |
| 2005/0201342 A1 * | 9/2005 | Wilkinson et al. | 370/338 |
| 2006/0099960 A1 | 5/2006 | Duan | |
| 2008/0159194 A1 * | 7/2008 | Westman et al. | 370/310 |

* cited by examiner

METHOD FOR INTERFACING A SECOND COMMUNICATION NETWORK COMPRISING AN ACCESS NODE WITH A FIRST COMMUNICATION NETWORK COMPRISING A CONTACT NODE

BACKGROUND OF THE INVENTION

Field of the Invention:

The invention relates to a method for interfacing a second communication network comprising an access node with a first communication network comprising a contact node.

Mobile radio networks, for example of the third mobile generation according to the 3GPP (Third Generation Partnership Project) standard (www.3gpp.org) such as, for instance, GPRS (General Packet Radio Service) or UMTS (Universal Mobile Telecommunications System) were originally designed with respect to individual terminals being interfaced by an air interface by means of an access network such as, for example, a so-called UTRAN (UMTS) radio access network with the so-called core network of the mobile radio network. In the meantime, however, other types of communication networks can be interfaced with a 3GPP network and thus handle the operation of an access network. Thus, 3GPP mobile radio networks in the meantime support various access networks such as, for example, GERAN (GSM Edge Radio Access Network), WMAN (Wireless Metropolitan Area Network) or WLAN (Wireless Local Area Network). In this context, the network operator or service provider (which, in the text which follows, will also only be called network operators without restriction), for example of a WLAN access network can be different from the network operator of the 3GPP network, i.e. the network operator of the communication network serving as access network and the network operator of the 3GPP mobile radio network do not need to be identical.

The document 3GPP TS 23.234 V6.5.0 (2005-06) 3rd Generation Partnership Project; Technical Specification Group Services and System Aspects; 3GPP System to Wireless Local Area Network (WLAN) Interworking; System Description (Release 6) specifies the interworking between a WLAN access network and a 3GPP system, i.e. a mobile radio network according to the 3GPP standard. In this document a procedure is defined which enables the access to the WLAN and a locally interfaced IP (Internet Protocol) network to be authenticated and to be authorized via the 3GPP system. In addition, a procedure is described which allows terminals in the WLAN to set up a connection to external IP networks such as, for example, third generation mobile radio networks, company intranet or the Internet via the 3GPP system.

In accordance with the architecture described in the document, the WLAN access network is interfaced with a so-called 3GPP AAA (Authentication, Authorization and Accounting) server via an interface called Wa interface. Corresponding to the name of the server, information for authentication (i.e. identity verification and identity check) for authorization (i.e. verification of the authorization to be allowed to use a particular service or a particular function) and for charging are essentially transported in a secured form via the Wa interface. The relevant 3GPP mobile radio network is the so-called home network of the user, i.e. there is usually a contractual relation between the operator of this network and the user and the user-specific data are usually stored in a network node of the home network.

In addition, a further interface, called Wn interface, is provided between the WLAN access network and the 3GPP home mobile radio network of a user of a terminal in the WLAN. Via the Wn interface, a terminal in the WLAN access network is connected to a so-called WLAN Access Gateway (WAG) of the 3GPP mobile radio network. The result is that any data traffic coming from the WLAN terminal is conveyed via a secure connection in the form of a so-called tunnel to the WLAN Access Gateway and further to a Packet Data Gateway (PDG). The Packet Data Gateway represents the actual tunnel endpoint.

BRIEF SUMMARY OF THE INVENTION

The present invention is based on the object of specifying a flexible and simple method for interfacing a second communication network with a first communication network.

According to the invention, this object is achieved by a method for interfacing a second communication network comprising an access node with a first communication network comprising a contact node, having at least the following steps: reading out or receiving an identity specific to the second communication network, stored in a storage medium of a memory node of the second communication network by the access node, sending an interfacing message containing the identity specific to the second communication network from the access node to the contact node which is specified by an address stored in the storage medium, and providing a packet data service to the access node via the contact node, effecting the interfacing of the second communication network with the first communication network. In this context, "providing a packet data service" means that a packet data service is provided between the access node and a network node of the first communication network, i.e. that the prerequisites are created for a transmission of packet data. This packet data transmission capability is connectionlessly established, i.e. no static connection in the sense of a circuit-switched transmission of data or voice is established.

The method according to the invention is preferred since it can be universally used for interfacing a communication network of any type with another communication network of any identical or different type. In this context, storing of the identity specific to the second communication network in the storage medium of the memory node of the second communication network provides for a flexible configuration of the contact node of the first communication network, which node is to be contacted for interfacing the second communication network. Preferably, this storage medium is output by the network operator of the first communication network to the network operator of the second communication network. Apart from the identity specific to the second communication network, the address of the contact node of the first communication network is also stored in the storage medium. This advantageously enables the access node of the second communication network to transmit an interfacing message to the contact node specified by the address independently of its location. This only requires the storage medium or the information stored in it.

According to the invention, a packet data service is provided between the access node of the second communication network and a network node of the first communication network, preferably the contact node. This means that the packet data service to the access node does not need to be set up directly with the or by the contact node. Instead, the contact node can preferably also be a network node which only has the information to which network node the interfacing message is to be forwarded, i.e. which network node should lastly provide the packet data service to the access node of the second communication network. The contact node is thus always involved in the interfacing of the second communication network with the first communication network to the extent that it determines the further sequence after reception of the interfacing message from the access node of the second communication network. Apart from the immediate provision of a data packet service to the access node, the contact node can indirectly provide such a packet data service by forwarding the received interfacing message to a further network node which then provides the packet data service.

The method according to the invention can preferably also be arranged in such a manner that the second communication network and the first communication network mutually authenticate themselves and the first communication network carries out an authorization of the second communication network. This embodiment of the method according to the invention is preferred since mutual authentication of the first communication network and of the second communication network ensures that the identity specified by the respective communication networks is actually correct. This prevents problems with respect to charging between the communication networks involved and also with respect to the security of the data transmission due to the encryption made possible by the mutual authentication. Furthermore, the first communication network can advantageously authorize the second communication network in order to find out whether the second communication network is actually authorized for interfacing with the first communication network.

The method according to the invention can advantageously also be arranged in such a manner that authentication data used for the authentication of the second communication network are stored in the storage medium. Storing authentication data used for the authentication of the second communication network in the storage medium is preferred since the storage medium also contains data relating to the interfacing of the second communication network with the first communication network. Storing the authentication data in the storage medium enables all data relating to the interfacing of the second with the first communication network to be jointly stored. These data are preferably output by the network operator or service provider of the first communication network.

The method according to the invention is preferably arranged in such a manner that the packet data service is set up as a secure data connection after successful authentication. Using a secure data connection between the first communication network and the second communication network is advantageous since intercepting of the data transmitted as part of the packet data service is to be prevented. Attention must be paid to the fact that the data connection is not a connection in the sense of traditional circuit-switched telephony but establishing the readiness and possibility of transmitting and/or receiving data packets.

In a further preferred embodiment of the method according to the invention, the secure data connection is set up in the form of a so-called VPN (Virtual Private Network) tunnel. Using a VPN tunnel is preferred since a connection encrypted in this manner provides for a confidential data exchange even with the interposition of further unsecured communication networks. To provide for a secure data transmission, for example even with interposition of the Internet, the data packets are encapsulated, i.e. transmitted in encrypted form. Preferably, a VPN technique such as, for example, IPSec (IP Security) or L2TP (Layer 2 Tunneling Protocol) is used in this context.

The method according to the invention can preferably also proceed in such a manner that the packet data service is provided wholly or partially wirelessly between the first communication network and the second communication network. This embodiment of the method according to the invention is preferred since it is frequently more flexible and simple in comparison with a completely wire-connected connection.

The method according to the invention can advantageously also proceed in such a manner that the packet data service is used for the transmission of charging data between the first communication network and the second communication network. The packet data service between the first communication network and the second communication network is thus preferably used, apart from the transmission of data relating to the authentication and the authorization, also for transmitting charging data. For example, this enables the access node of the second communication network to send charging-related information to the first communication network in which corresponding charging can then be carried out.

In a further advantageous embodiment of the method according to the invention, the second communication network can be interfaced with the first communication network via at least one further communication network. This embodiment is preferred since this obviates the necessity of a direct connection between the first and the second communication network. Instead, the connection can be made with interposition of a further communication network, preferably the Internet.

The method according to the invention preferably proceeds in such a manner that terminals are operated in the second communication network. In this arrangement, the users of the terminals can advantageously access, for example, services and/or information in the first communication network by means of the second communication network and/or use data specific to the user of the terminal, available for authentication, authorization and charging in the first communication network.

The method according to the invention can preferably also proceed in such a manner that the terminals in each case set up their own packet data service to the first communication network for utilizing services of the first communication network. This embodiment of the method according to the invention is preferred since the terminals thus do not need to use the packet data service set up between the first and the second communication network for accessing the first communication network. Instead, the terminals can in each case request the setting-up of separate packet data services from the first communication network. In this arrangement, the corresponding data packet services can also be set up to other network nodes of the first communication network than the packet data service set up from the access node of the second communication network to the first communication network.

In a further preferred embodiment of the method according to the invention, the packet data service between the terminals and the first communication network is in each case set up as a secure data connection. This can be done, for example, in the form of an IPSec (IP Security) connection and is advantageous since this protects the confidentiality and integrity of the transmitted data.

The method according to the invention can also preferably be arranged in such a manner that the terminals use the packet data service set up between the first communication network and the second communication network for utilizing services of the first communication network. In this arrangement, the packet data service set up between the first and the second communication network can also be utilized when the terminals, for utilizing services of the first communication network, in each case set up a separate, possibly secure packet data service to the first communication network which is tied into the packet data service between the first and the second communication network in this case. This embodiment of the method according to the invention is advantageous since in this arrangement any packet data traffic between the first and the second communication network, i.e. also one which goes into and out of terminals of the second communication network, can take place via the packet data service set up as part of interfacing the second communication network with the first communication network.

The method according to the invention preferably proceeds in such a manner that the terminals authenticate and/or authorize themselves with respect to the first communication network by means of the identity of the second mobile radio network stored in the storage medium. This embodiment is advantageous since, from the point of view of the network operator or service provider of the first communication network, it provides for immediate direct accounting for any utilization initiated by terminals of the second communication network, i.e., for example, data transmission from and to the first communication network or using services of the first communication network, with the network operator or service provider of the first communication network. Although direct charging between the network operator of the first communication network and the users of the terminals of the second communication network is possible, it is not required.

In a further preferred embodiment of the method according to the invention, the terminals authenticate and/or authorize themselves with respect to the first communication network and/or the second communication network by means of data stored in storage means of the terminals. This provides the advantage that charging of the data transmitted from a terminal from and/or to the second communication network or of services used, respectively, can take place directly and preferably exclusively between the first communication network and the terminal. The storage means are preferably a SIM card on which data identifying the terminal and needed for authentication are preferably stored. The SIM card, also called UICC (Universal Integrated Circuit Chip) as part of 3GPP standardization, usually contains at least one application called (U)SIM ((Universal) Subscriber Identity Module). This usually contains all subscriber-specific data such as, for example, the international mobile subscriber directory number MSISDN (Mobile Subscriber ISDN Number), the international mobile subscriber identity or IMSI and the routines and parameters used during the registration of the terminal in the mobile radio network for authentication and code agreement. In addition, the SIM card can contain further applications such as, for example, a so-called ISIM (IP Multimedia Services Identity Module).

The method according to the invention can preferably also proceed in such a manner that the access node determines its current location and sends it to the contact node of the first communication network in the interfacing message. This is preferred since this provides the contact node with additional information which can be taken into consideration by it thereafter. The contact node can thus preferably determine in dependence on the current location of the second communication network (or of the access node, respectively) a network node of the second communication network which provides the packet data service to the access node of the second communication network. The location of the second communication network is not necessarily known in advance to the contact node of the first communication network since in the method according to the invention, the second communication network is dynamically interfaced with the first communication network, which includes the possibility of a changing location of the second communication network. Furthermore, the second communication network can be interfaced with the first communication network preferably by interposition of a further communication network such as, for example, the Internet so that the location of the second communication network is not recognizable or predetermined for the first communication network.

In a further preferred embodiment of the method according to the invention, the first communication network provides network services for the second communication network. Such network services can be, for example, a so-called firewall or a so-called network address translation (NAT) service. Interfacing the second communication network with the first communication network enables the second communication network to use or offer a service of the first communication network which it does not support. The agreement between the first communication network and the second communication network about which network services should be usable for the second communication network can be made either online as part of the interfacing or established contractually in advance and configured statically offline.

The method according to the invention is preferably arranged in such a manner that a smart card issued by the network operator or service provider of the first communication network, a SIM card or a file is used as storage medium. A smart card, also called chip card or integrated circuit card (ICC) is a card usually made of plastic with an inbuilt microchip which usually contains at least one memory. A SIM (Subscriber Identity Module) card represents a special embodiment of a smart card of the type which is normally used for authenticating users within a mobile radio network. As an alternative to the two aforementioned hardware-based solutions, the storage medium can also be arranged in the form of a file. This is a software-based solution which avoids issuing a concrete card. However, even if a file is used as storage medium, it must be ensured, as when using a SIM card or smart card, that the information stored in the storage medium is protected against manipulation by unauthorized persons. Using a SIM card, a smart card or a file as storage medium is preferred since by this means the parameters required for interfacing the second communication network with the first communication network can be stored in a simple and universal manner and provided to the second communication network.

The method according to the invention can be advantageously arranged also in such a manner that further data relating to the second communication network are stored in the storage medium. These data can be any data which are of significance to the second communication network with respect to the first communication network or to the contractual relationship between the network operator of the second communication network and that of the first communication network.

In the method according to the invention, an Internet protocol (IP) address is preferably used as the address. This embodiment of the method according to the invention is advantageous since IP addresses are normally used for addressing during the transmission of packet data. As an alternative, the address can also be, for example, a logical address which identifies the contact node of the first communication network and is converted into an IP address, for example by means of the so-called Domain Name System (DNS) method. This does not require the logical address to contain information relating to the location of the contact node.

The method according to the invention can also proceed preferably in such a manner that the access node is used as memory node. This embodiment is advantageous since the access node thus has direct access to the storage medium which obviates the necessity of a separate memory node and communication between the access node and the memory node.

As the first communication network, any communication network suitable for transmitting packet data can be used. This can be both a fixed network and a mobile radio network, for example according to the CDMA (Code Division Multiple Access) standard. The embodiment of the method according to the invention, that a mobile radio network according to the 3rd Generation Partnership Project (3GPP) standard is used as the first communication network, is particularly preferred, however. This is preferably a mobile radio network according to the GPRS (General Packet Radio Service) or the UMTS (Universal Mobile Telecommunications System) standard. Using a mobile radio network according to the 3GPP standard as the first communication network is advantageous since this is a widely used mobile radio standard which provides for packet-data-based data transmission in mobile radio networks. Due to the wide distribution and associated high number of users or terminals of this standard, communication networks according to this 3GPP standard are available for interfacing a second communication network throughout the world in many different countries and regions.

The second communication network can be, for example, a communication network according to the Bluetooth standard. In a particularly preferred embodiment of the method according to the invention, a wireless local area network (WLAN), a wireless metropolitan area network (WMAN) or a communication network according to the Worldwide Interoperability for Microwave Access standard (WiMAX) is used as the second communication network. These types of communication networks are widely used access networks which provide for access into data networks at the most varied locations, sometimes also called hotspots, or in regions called hot zones.

In addition, the invention relates to an arrangement for interfacing a second communication network with a first communication network.

With respect to the arrangement, the present invention is based on the object of specifying a flexible and simple arrangement for interfacing a second communication network with a first communication network.

According to the invention, the above object is achieved by an arrangement for interfacing a second communication network with a first communication network, wherein the second communication network has a memory node comprising a storage medium in which an identity specific to the second communication network and an address identifying a contact node of the first communication network are stored, and an access node for reading out or receiving the identity specific to the second communication network from the storage medium of the memory node and for sending an interfacing message containing the identity specific to the second communication network to the contact node, predetermined by the address stored in the storage medium, of the first communication network, and the contact node is arranged for providing a packet data service to the access node, effecting the interfacing of the second communication network with the first communication network.

The arrangement according to the invention is advantageous since it provides for dynamic and location-independent interfacing of the second communication network with the first communication network. This is done due to the fact that in the storage medium of the memory node, an identity specific to the second communication network and an address identifying a contact node of the first communication network are stored which are used in the interfacing of the second communication network with the first communication network. Thus, a static configuration of the first and/or of the second communication network tailored for the location of interfacing the communication networks, and thus an inflexible configuration of the interfacing of the second communication network with the first communication network which, for example, would exclude a change of location of the second communication network without elaborate changing of the configuration, is not required.

The arrangement according to the invention is preferably arranged in such a manner that authentication data used for the authentication of the second communication network are stored in the storage medium. Storing the authentication data in the storage medium is advantageous since this provides for mutual identity checking of the first communication network and the second communication network. The first communication network can preferably be authenticated by the second communication network by using so-called certificates. The mutual authentication creates the prerequisite for being able to provide a packet data service between the two communication networks in an encrypted form.

In a further advantageous embodiment of the arrangement according to the invention, the second communication network is interfaced with the first communication network via at least one further communication network. This embodiment is preferred since the interfacing can thus be done, for example, by interposing the Internet. Due to the fact that a direct connection between the second and the first communication network is not required, the second communication network can be interfaced with the first communication network largely independently of location.

The arrangement according to the invention can advantageously also appear in such a manner that terminals are connected to the second communication network. In this arrangement, the terminals can utilize, for example, not only the functionality offered by the second communication network but in addition also access services and/or data of the first communication network via the second communication network.

In a further preferred embodiment of the arrangement according to the invention, the terminals have storage means in which data for authentication and/or authorization of the respective terminal by the first and/or the second communication network are stored. This is advantageous since thus, as an alternative to authentication and/or authorization of the terminals by using the storage medium of the memory node, the respective terminal can also be authenticated and/or authorized directly by the first and/or particularly also by the second communication network.

The arrangement according to the invention is preferably arranged in such a manner that the storage medium is a smart card issued by the network operator or service provider of the first communication network, a SIM card or a file. This advantageously provides for simple and flexible issuing of the parameters, needed by the second communication network for the interfacing with the first communication network, by the operator of the first communication network. Similar to the known issuing of a SIM card for an individual terminal, a storage medium can thus be issued hardware- or software-based by the operator or service provider of the first communication network which enables the second communication network to interface location-independently and flexibly with the first communication network.

The arrangement according to the invention is preferably arranged in such a manner that further data relating to the second communication network are stored in the storage medium.

In a further preferred embodiment of the arrangement according to the invention, the access node is the memory node. The fact that the access node additionally handles the function of the memory node and thus obtains direct access to the storage medium simplifies the arrangement. There is no necessity for a separate network node for the memory node and communication between the access node and the memory node.

The arrangement according to the invention can be preferably arranged in such a manner that the first communication network is a mobile radio network according to the 3rd Generation Partnership Project (3GPP) standard. As already explained previously, using a mobile radio network according to the 3GPP standard as the first communication network is advantageous since this is a widely used mobile radio standard of the third generation which enables high-performance packet data services to be provided.

The arrangement according to the invention can advantageously also appear in such a manner that the second communication network is a wireless local area network (WLAN), a wireless metropolitan area network (WMAN) or a communication network according to the Worldwide Interoperability for Microwave Access standard (or WiMAX). This embodiment is preferred since networks according to these standards are widely used access technologies for utilizing packet data switched networks and services.

In addition, the invention relates to a storage medium for interfacing a second communication network with a first communication network.

With respect to the storage medium, the invention has the basic object of specifying a storage medium which provides for flexible and simple interfacing of a second communication network with a first communication network.

According to the invention, the aforementioned object is achieved by a storage medium for interfacing a second communication network with a first communication network, wherein an identity specific to the second communication network and an address identifying a contact node of the first communication network are stored in the storage medium to be used in the second communication network. The storage medium according to the invention is advantageous since it enables both an identity specific to the second communication network and an address identifying a contact node of the first communication network to be stored in such a manner that this information can be read out by the second communication network and used for interfacing with the first communication network.

The storage medium according to the invention is preferably arranged in such a manner that authentication data used for the authentication of the second communication network by the first communication network are stored in the storage medium. According to the previous embodiments, this is advantageous since this provides for mutual identity checking of the first and of the second communication network.

In a further preferred embodiment of the storage medium according to the invention, further data relating to the second communication network are stored in the storage medium. Thus, all data relevant to the interfacing of the second communication network with the first communication network, which are needed by the second communication network, can be advantageously stored in the storage medium and thus at a central location.

The storage medium according to the invention is advantageously a SIM card issued by the network operator or service provider of the first communication network, a smart card or a file.

DESCRIPTION OF THE INVENTION

Figure 1:
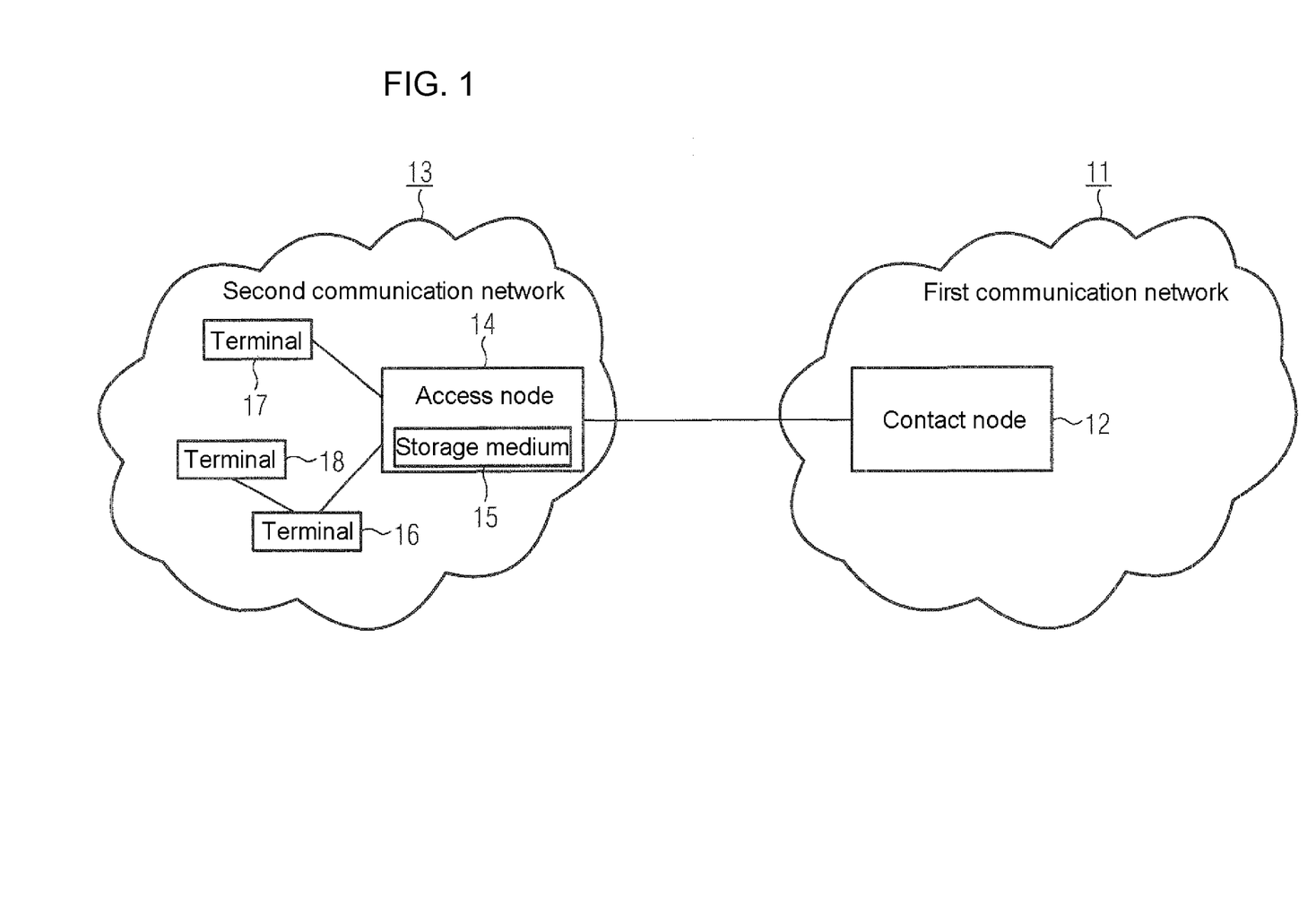
FIG. 1 shows a diagrammatic sketch of a first exemplary embodiment of the arrangement according to the invention.

FIG. 1 shows in a diagrammatic sketch an exemplary embodiment of the arrangement according to the invention. It shows a first communication network 11 in the form of a mobile radio network according to the 3GPP standard. As an alternative, the first communication network 11 could also be a communication network according to any other fixed network or mobile radio standard.

The first communication network 11 has a contact node 12 in the form of an AAA (Authentication, Authorization and Accounting) server. As an alternative, depending on the type of the first communication network 11, the contact node 12 could also be, for example, one of the following network nodes: a radio network controller, a WLAN access gateway (WAG), a packet data gateway (PDG) or a GGSN (GPRS Gateway Support Node).

In addition, FIG. 1 shows a second communication network 13 in the form of a WLAN which has been set up at the location of an approaching major event. As an alternative, the second communication network 13 could be provided, for example, by a communication network according to the WiMAX standard or the 3GPP standard, a personal network, a personal area network (PAN), a body area network (BAN) or an ad-hoc network. In this context, a personal network involves a number of terminals of a user which can be connected to one another, i.e. can communicate with one another via a communication network, independently of the current position of the terminals. In general, a personal area network is the designation for a number of network-enabled terminals, normally of one user, which are combined to form one network. In this arrangement, the access of the terminals to a communication network is effected via one of the terminals which handles the function of a mobile router and, for example, can be the only one of the terminals which has a SIM card for authentication and authorization with respect to the communication network. The term body area network designates a communication network which consists of sensors and actuators worn on the human body by means of which data can be transmitted to a communication network via a central terminal. The ad-hoc network is normally the designation of a dynamically organized network with terminals which can communicate with one another.

The second communication network 13 has an access node 14 in the form of a so-called WLAN access point. As an alternative, the access node 14 could be, for example, one of the following network elements or network nodes, depending on the type of the second communication network 13: a gateway between the network of two network operators, a WLAN access router, a mobile router or any network node or any mobile terminal which handles the function of the access node.

The access node 14 of the second communication network 13 has a storage medium 15, i.e. is arranged as memory node, at the same time. The access node 14 is connected via an air interface to WLAN-enabled terminals 16 and 17, i.e. terminals arranged for data transmission via a WLAN. In addition, a terminal 18 can be seen which is interfaced indirectly, i.e. via the terminal 16, with the access node 14 of the second communication network 13.

The terminals 16 and 18 are two terminals of the same user which are connected together within the second communication network 13 to form a personal area network (PAN). As a result, the terminal 18 which, in contrast to terminal 16, does not have its own SIM card, can also access the WLAN via terminal 16, i.e. the WLAN-enabled terminal 16 handles the function of a mobile router, i.e. of a network node, within the PAN. For the entire PAN, authentication and authorization with respect to the first communication network 11 occurs through the terminal 16. This enables both the terminal 18 and the terminal 16 to use the second communication network 13.

The method for interfacing the second communication network 13 with the first communication network 11 then proceeds in such a manner that the access node 14 first reads out an identity specific to the second communication network 13 and the address of the contact node 12 of the first communication network 11 from the storage medium 15.

In the next step, the access node 14 sends the identity specific to the second communication network 13 to the address of the contact node 12 of the first communication network 11 in an interfacing message. In addition, the access node 14 can also send information relating to its current location to the contact node 12 in the interfacing message. In this context, the location can be determined from a signal radiated by the first communication network 11 and given, for example, by the identity of the mobile radio cell (also called cell ID), the location area (also called routing area) or the identity of a local communication network.

On the basis of the interfacing message, the contact node 12 provides a packet data service to the access node 14. As an alternative, the contact node 12 of the first mobile radio network 11 could also forward the interfacing message to another network node of the first communication network 11 which would then handle the further processing of the interfacing message by the first communication network 11.

The packet data service or data transmission service between the first communication network 11 and the second communication network 13 can be produced partially or completely wirelessly, i.e. in the form of a radio link.

In the next step, mutual authentication is carried out between the contact node 12 and the access node 14. In addition, the contact node 12 can check, on the basis of the identity of the second communication network 13 verified by a successful authentication whether the second communication network 13 is authorized, i.e. permitted, for interfacing with the first communication network 11.

In accordance with the previous statements, the packet data service provided is used for exchanging signaling messages, relating to the authentication and authorization, between the second communication network 13 and the first communication network 11. In addition, the access node 14 can send charging messages relating to the terminals 16, 17 and 18 to the contact node 12 by means of the packet data service.

In the next step, the contact node 12 assigns to the access node 14 a dynamic IP address which provides for data transmission to the access node 14. However, this is only required if the IP address of the access node 14 is not statically preconfigured.

The terminals 16 and 17 which have their own SIM card and wish to use it, can now authenticate themselves with respect to the first communication network 11. In this context, the access node 14 can forward the corresponding authentication messages to the contact node 12 by means of the packet data service provided. The terminal 18 which, together with the terminal 16, forms a PAN and does not have its own SIM card makes use of the authentication of the terminal 18 and thus does not need its own authentication.

As an alternative, the authentication (and possibly a subsequent authorization) of the terminals 16, 17 and 18 with respect to the first communication network 11 could occur generally, or only in the case where the terminals 16, 17 and 18 do not have their own SIM cards, in contrast to the previous statements, by means of the storage medium 15 of the access node 14. In this case, the network operator of the communication network 13 is responsible for the entire packet data traffic caused by terminals 16, 17 and 18 with respect to the first communication network 11 from the point of view of the network operator of communication network 11. This thus relates to all packet data which are received by the terminals from the first communication network 11 or, respectively, are transmitted to the first communication network 11. The consequence is that the network operator of the first communication network 11 settles the charges for the corresponding packet data traffic with the network operator of the second communication network 13. Charging the terminals 16, 17 and 18 or their users, respectively, in this case occurs exclusively through the network operator of the second communication network 13.

In principle, only some of the terminals 16, 17 and 18 can authenticate themselves by means of the storage medium 15 with respect to the first communication network 11 whilst another part of the terminals authenticates itself directly with respect to the contact node 12.

IP addresses can be issued to the terminals 16, 17 and 18 in various ways. One possibility consists in that the access node 14 produces a service called network address translation (NAT), i.e. assigns local IP addresses to the terminals 16, 17 and 18. As an alternative, the terminals 16, 17 and 18 can configure their own IP address by using a prefix allocated to the access node 14. It is also possible for the terminals 16, 17 and 18 to be assigned their respective IP addresses by the first communication network 11.

In a further method step, the first communication network 11 and the second communication network 13 can then agree whether and possibly which network services are provided to the second communication network 13 by the first communication network 11. Such a network service can be, for example, a network address translation (NAT) service, a firewall service or also special agreements for charging. For instance, it can be established that charging occurs on the basis of the IP addresses of the terminals 16, 17 and 18. As an alternative, for example, the terminals 16 and 18 which combined to form a PAN could be charged on the basis of the SIM card of terminal 16. This could be done even if both terminals 16 and 18 in each case had their own SIM card.

Terminals 16, 17 and 18 can now provide their own, secure packet data services for the first communication network 11 or, respectively, request the corresponding provision of a packet data service by the first communication network 11. In this arrangement, the packet data service already existing between the two communication networks 11 and 12 can be used. As an alternative, however, completely independent packet data services can be provided. In addition, terminals 16, 17 and 18 can also additionally set up packet data services to other communication networks such as, for example, the Internet, via the second communication network 13.

As already mentioned, the second communication network 13 shown in FIG. 1 could also be overall a personal area network (PAN), instead of a WLAN. In this case, the PAN would comprise not only terminals 16 and 18 but additionally also terminal 17 and the access node 14. The access node 14 would in this case be a terminal which has a storage module 15 in the form of a SIM card. The storage module 15 could now be used for interfacing the PAN with the first communication network 11 in accordance with the method described above. This illustrates that the arrangement described and the method described can be used for interfacing the most varied communication networks.

Figure 2:
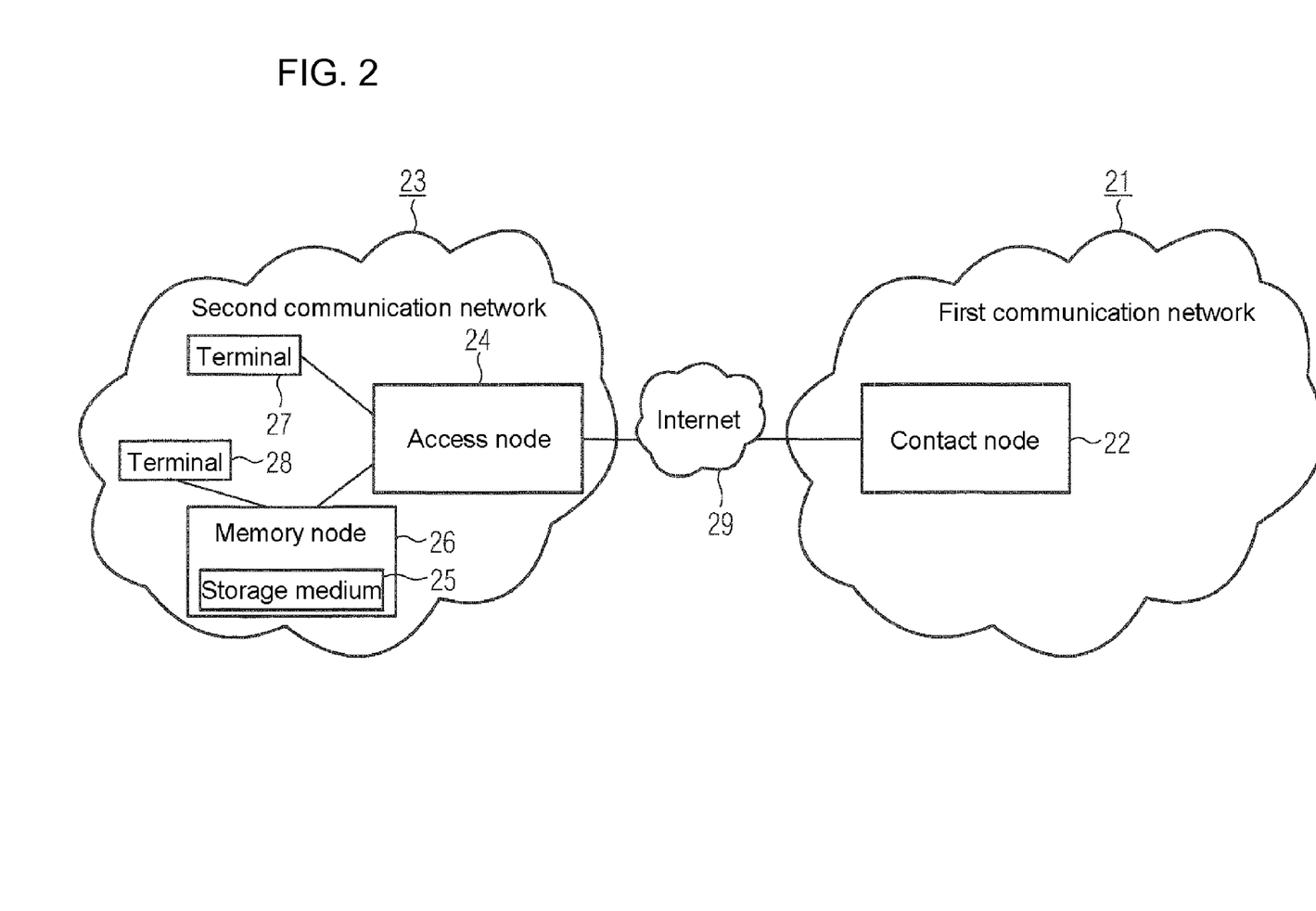
FIG. 2 shows a diagrammatic sketch of a second exemplary embodiment of the arrangement according to the invention.

FIG. 2 shows in a diagrammatic sketch a second exemplary embodiment of the arrangement according to the invention. Analogously to FIG. 1, a first communication network 21 in the form of a mobile radio network according to the 3GPP standard such as, for example, the GPRS standard, is shown. The first communication network 21 has a contact node 22. In addition, FIG. 2 shows a second communication network 23 comprising an access node 24. The second communication network 23 is a WLAN which belongs to a company which has specialized in organizing major events. In this context, the company offers as one of its services in the major events, access to the Internet and to services in 3GPP networks by means of an access node 24 in the form of a WLAN access router. In this arrangement, a number of WLAN access points are usually connected to a WLAN access router. Since major events such as, for example, the Olympic games or football world championships are usually limited in time and take place at changing locations, this means that the entire WLAN of the company frequently changes its location since it is in each case set up at the current location of the respective major event. After the installation, interfacing of the second communication network 23 with the first communication network 21 is required in each case.

The access node 24 is not necessarily connected directly to the first communication network 21. Instead, the connection between the first communication network 21 and the second communication network 23 is effected via an interposed further communication network 29 in the exemplary embodiment of FIG. 2. The interposed further communication network 29 is in this case the Internet. Thus, for example, a DSL (Digital Subscriber Line) connection can be provided from the access node 24 of the second communication network 23 to the contact node 22 of the first communication network 21 via the further communication network 29. As an alternative, the network operators of the further communication network 29 and of the first communication network 21 can have made a so-called roaming agreement. Such an agreement allows terminals 27 and 28 of users which have a contract with the network operator of the first communication network 21 to use the further communication network 29. In this case, the further communication network 29 authenticates and authorizes terminals 27 and 28 usually on the basis of information received from the first communication network 21.

If the network operators of the further communication network 29 and of the first communication network 21 have not made a roaming agreement, the possibility exists as an alternative that the network operator of the second communication network 23 has concluded a contract with the network operator of the further communication network 29 which enables the second communication network 23 to use the further communication network 29.

In the exemplary embodiment of FIG. 2, the second communication network 23 has in addition to the access node 24 a memory node 26. This has access to the storage medium 25. Between the access node 24 and the memory node 26, a connection exists via which the access node 24 can receive or read out from the storage medium 25 the data which it needs for the interfacing of the second communication network 23 with the first communication network 21.

After interfacing the first communication network 21 with the second communication network 23, terminals 27 and 28 can access data and/or services of the first communication network 21 by means of the second communication network 23 and the interposed further communication network 29. For this purpose, a data transmission by radio occurs between the terminal 27 and the access node 24 which is a WLAN access router. The terminal 28 is indirectly interfaced with the access node 24 via the memory node 26 which is a WLAN access point.

It should be pointed out that a third communication network or a number of third communication networks can also be interfaced with or via the second communication network 23 by means of the method described. In this context, the interfacing of the third communication network can be carried out directly with the second communication network 23, i.e. the third communication network sends an interfacing message to a contact node of the second communication network 23. In addition, however, it is also possible that the second communication network 23 handles the function of an interposed further communication network with respect to the third communication network, i.e. an access node of the third communication network sends the interfacing message to the contact node 22 of the first communication network 21 via the second communication network 23 in this case.

Figure 3:
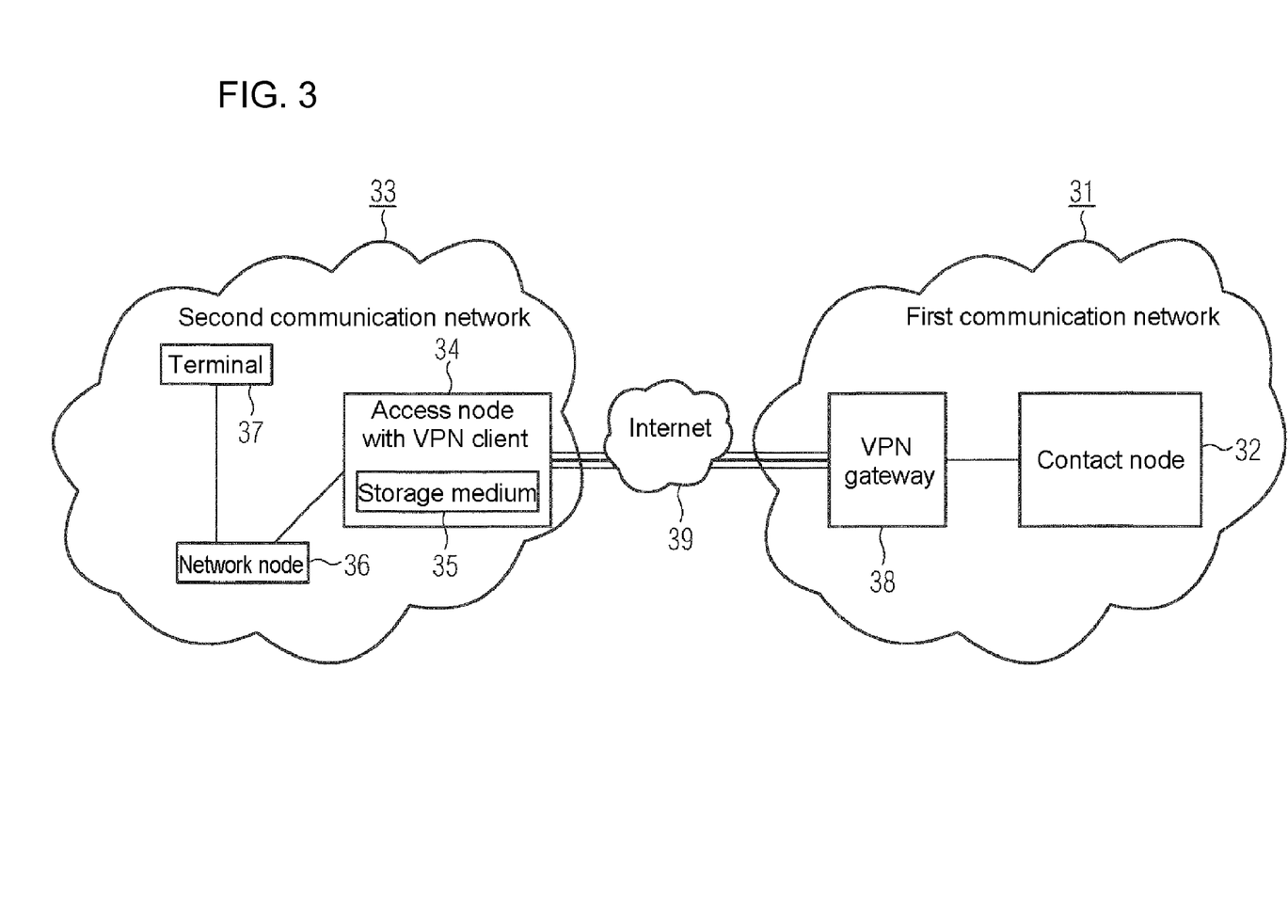
FIG. 3 shows a diagrammatic sketch of a third exemplary embodiment of the arrangement according to the invention.

FIG. 3 shows in a diagrammatic sketch a third exemplary embodiment of the arrangement according to the invention. A second communication network 33 is again shown which is interfaced with a first communication network 31 in the form of a mobile radio network according to the 3GPP standard via a further communication network 39 in the form of the Internet. In real terms, the access node 34 which contains a VPN (Virtual Private Network) client is connected to the contact node 32, arranged in the form of an AAA server, via the further communication network 39 and via a VPN gateway 38. Since a public, unprotected further communication network 39 is connected between the first communication network 31 and the second communication network 33, data transmission between the access node 34 and the contact node 32 occurs by means of a VPN tunnel. This tunnel provides for a secure data transmission shielded against the environment between the first communication network 31 and the second communication network 33. Analogously to the previous statements relating to FIGS. 1 and 2, this VPN connection is used, for example, for signaling charging-related data. In this arrangement, a normally used VPN technique such as, for example, IPSec (IP Security) or L2TP (Layer 2 Tunneling Protocol) can be used. As an alternative, for example, TLS (Transport Layer Security) or DTLS (Datagram TLS) can also be used for secure data exchange.

The second communication network 33 is interfaced with the first communication network 31 via the contact node 32 in the form of an AAA server. Using the address of the contact node 32, stored in the storage medium 35, of the first communication network 33 and the identity specific to the second communication network 33, also stored in the storage medium 35, a packet data service can be provided between the second communication network 33 and the first communication network 31. This can be done without requiring a static configuration or a new contract negotiation between the network operator of the first communication network 31 and the network operator of the second communication network 33 for this purpose.

In addition, authentication data used for authenticating the second communication network 33 are stored in the storage medium 35. It is only after a successful authentication and authorization that a VPN connection is set up between a VPN gateway 38 and the access node 34 with the VPN client. In this arrangement, the VPN gateway 38 can be implemented as separate network node or as part of the contact node 32.

A terminal 37 of the second communication network 33 can then authenticate and authorize itself with respect to the contact node 32 arranged as AAA server, for example via a network node 36 in the form of a WLAN access point, by means of the access node 34. Once this has happened, a VPN tunnel can be set up, for example in the form of an IPSec tunnel, between terminal 37 and a packet data gateway (PDG), not shown in FIG. 3, for providing a packet data service. In this context, the VPN connection established between the first communication network 31 and the second communication network 33 can be used or a separate packet data service, also encrypted, can be provided which advantageously avoids the occurrence of interleaved tunnels (i.e. of tunnels within tunnels).

The authentication data stored in the storage medium 35 can be, for example, a shared secret, which is only known to the first communication network 31 and the second communication network 33, or certificates used as part of the authentication and the encryption. The encryption can be done according to a method designated as symmetrical or as asymmetrical or in accordance with a method which has symmetric and asymmetric components.

It should be pointed out that the second communication network 33 can also set up secured connections to a number of first communication networks 31 at the same time. These can be, for example, the 3GPP mobile radio networks of different network operators.

Figure 4:
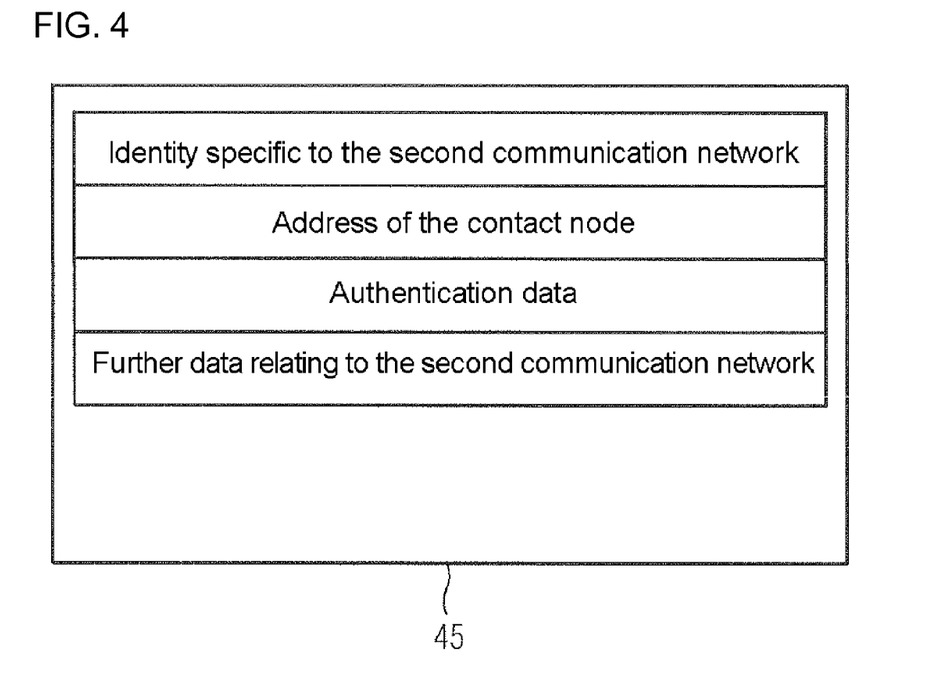
FIG. 4 shows a diagrammatic sketch of an exemplary embodiment of the storage medium according to the invention.

FIG. 4 shows an exemplary embodiment of the storage medium according to the invention in a diagrammatic sketch. It shows a storage medium 45 in the form of a SIM card. In the storage medium 45, the identity specific to the second communication network, the address of the contact node and authentication data and other data relating to the second communication network are stored as parameters. The further data relating to the second communication network can be, for example, data relating to the contract between the network operators of the first and of the second communication network and/or network preferences and/or a list of the network services provided to the second communication network by the first communication network.

The invention claimed is:

1. A method for interfacing a second communication network including an access node with a first communication network containing a contact node, wherein the second communication network is an access network and the first communication network is a core network, which comprises the steps of:

using the access node to one of read out and receive an identity specific to the second communication network, stored in a storage medium of a memory node of the second communication network;

sending an interfacing message containing the identity specific to the second communication network from the access node to the contact node being specified by an address stored in the storage medium;

providing a packet data service to the access node via the contact node, effecting the interfacing of the second communication network with the first communication network;

performing a mutual authentication of the second communication network and the first communication network;

carrying out an authorization, via the first communication network, of the second communication network;

storing authentication data used for authentication of the second communication network in the storage medium; and using the access node as a memory node, wherein the memory node provides the storage medium.

2. The method according to claim 1, which further comprises providing the packet data service as a secure data connection after successful authentication.

3. The method according to claim 2, which further comprises setting up the secure data connection in a form of a so-called virtual private network tunnel.

4. The method according to claim 1, which further comprises providing the packet data service wholly or partially wirelessly between the first communication network and the second communication network.

5. The method according to claim 1, which further comprises using the packet data service for transmitting charging data between the first communication network and the second communication network.

6. The method according to claim 1, which further comprises interfacing the second communication network with the first communication network via at least one further communication network.

7. The method according to claim 1, which further comprises operating terminals in the second communication network.

8. The method according to claim 7, wherein the terminals in each case set up their own packet data service to the first communication network for utilizing services of the first communication network.

9. The method according to claim 8, which further comprises providing the packet data service between the terminals and the first communication network in each case as a secure data connection.

10. The method according to claim 7, wherein the terminals use the packet data service set up between the first communication network and the second communication network for utilizing services of the first communication network.

11. The method according to claim 7, wherein the terminals at least one of authenticate and authorize themselves with respect to the first communication network by use of the identity of the second communication network stored in the storage medium.

12. The method according to claim 1, wherein the terminals at least one of authenticate and authorize themselves with respect to the first communication network and/or the second communication network by use of data stored in storage device of the terminals.

13. The method according to claim 1, wherein the access node determines its current location and sends the current location to the contact node of the first communication network in an interfacing message.

14. The method according to claim 1, wherein the first communication network provides network services for the second communication network.

15. The method according to claim 1, which further comprises using one of a smart card issued by one of a network operator and a service provider of the first communication network, a SIM card, and a file as the storage medium.

16. The method according to claim 1, which further comprises storing further data relating to the second communication network in the storage medium.

17. The method according to claim 1, which further comprises using an Internet protocol (IP) address as the address.

18. The method according to claim 1, which further comprises using a mobile radio network according to the 3rd Generation Partnership Project (3GPP) standard as the first communication network.

19. The method according to claim 1, which further comprises using one of a wireless local area network (WLAN), a wireless metropolitan area network (WMAN), and a communication network according to the Worldwide Interoperability for Microwave Access standard (WiMAX) as the second communication network.

20. A configuration for interfacing a second communication network with a first communication network, the configuration comprising:
- a first communication network being a core network, the first communication network including a contact node disposed therein;
- a second communication network being an access network, the second communication network including a memory node with a storage medium for storing an identity specific to the second communication network and an address identifying said contact node;
- an access node for one of reading out and receiving the identity specific to the second communication network from said storage medium of said memory node and for sending an interfacing message containing the identity specific to the second communication network to said contact node, predetermined by the address stored in said storage medium;
- said contact node disposed for setting up a packet data service to said access node, effecting the interfacing of the second communication network with the first communication network;
- wherein a mutual authentication of the second communication network and the first communication network is performed, and an authorization, via the first communication network, of the second communication network is carried out;
- wherein authentication data, which is used for authentication of the second communication network, are stored in said storage medium; and
- wherein the access node is utilized as a memory node, and wherein the memory node provides the storage medium.

21. The configuration according to claim 20, further comprising at least one further communication network interfacing the second communication network with the first communication network.

22. The configuration according to claim 20, further comprising terminals connected to the second communication network.

23. The configuration according to claim 22, wherein said terminals have a storage device in which data for at least one of authentication and authorization of a respective terminal by at least one of the first and the second communication network are stored.

24. The configuration according to claim 20, wherein said storage medium is one of a smart card issued by one of a network operator and a service provider of the first communication network, a SIM card, and a file.

25. The configuration according to claim 20, wherein further data relating to the second communication network are stored in said storage medium.

26. The configuration according to claim 20, wherein the first communication network is a mobile radio network according to the 3rd Generation Partnership Project (3GPP) standard.

27. The configuration according to claim 20, wherein the second communication network is selected from the group consisting of a wireless local area network (WLAN), a wireless metropolitan area network (WMAN) and a communication network according to the worldwide interoperability for microwave access standard (WiMAX).

28. A non-transitory storage medium for interfacing a second communication network with a first communication network, the storage medium comprising:
- an identity specific to the second communication network and an address identifying a contact node of the first communication network being stored in the storage medium to be used in the second communication network;
- wherein the second communication network is an access network and the first communication network is a core network.

29. The storage medium according to claim 28, wherein authentication data used for authentication of the second communication network by the first communication network are stored in the storage medium.

30. The storage medium according to claim 28, wherein further data relating to the second communication network are stored in the storage medium.

31. The storage medium according to claim 28, wherein the storage medium is one of a SIM card issued by one of a network operator and a service provider of the first communication network, a smart card, and a file.

* * * * *